US009105030B2

(12) United States Patent
Deneef

(10) Patent No.: US 9,105,030 B2
(45) Date of Patent: Aug. 11, 2015

(54) SYSTEM FOR SELECTING AND PURCHASING PRODUCTS AT A FIXED PRICE

(75) Inventor: Philippe Deneef, Haasrode (BE)

(73) Assignee: VIVABOXES INTERNATIONAL, Diegem (BE)

( * ) Notice: Subject to any disclaimer, the term of this patent is extended or adjusted under 35 U.S.C. 154(b) by 1498 days.

(21) Appl. No.: 10/740,668

(22) Filed: Dec. 22, 2003

(65) Prior Publication Data

US 2004/0133505 A1 Jul. 8, 2004

(30) Foreign Application Priority Data

Dec. 24, 2002 (BE) .................................. 2002/0747

(51) Int. Cl.
*G06Q 40/00* (2012.01)
*G06Q 30/02* (2012.01)
*G06Q 30/06* (2012.01)
*G06Q 40/04* (2012.01)

(52) U.S. Cl.
CPC ............... *G06Q 30/02* (2013.01); *G06Q 30/06* (2013.01); *G06Q 40/04* (2013.01)

(58) Field of Classification Search
USPC ............................... 705/41, 14, 26, 27, 35–40
See application file for complete search history.

(56) References Cited

U.S. PATENT DOCUMENTS

| | | | |
|---|---|---|---|
| 1,523,783 A * | 1/1925 | Lansden ..................... 40/642.02 |
| 2,061,139 A * | 11/1936 | Cohen ........................... 206/489 |
| 4,558,783 A | 12/1985 | Dangerfield et al. |
| 5,088,619 A * | 2/1992 | Shank ........................... 220/532 |
| 5,513,117 A | 4/1996 | Small |
| 5,794,634 A | 8/1998 | Noren et al. |
| 5,839,117 A * | 11/1998 | Cameron et al. ................ 705/27 |
| 5,870,718 A | 2/1999 | Spector |
| 5,963,916 A * | 10/1999 | Kaplan ............................ 705/26 |
| 6,138,106 A * | 10/2000 | Walker et al. ................ 705/14.1 |
| 6,175,823 B1 * | 1/2001 | Van Dusen ...................... 705/26 |
| 6,240,397 B1 | 5/2001 | Sachs |
| 6,321,211 B1 * | 11/2001 | Dodd .............................. 705/26 |
| 6,357,584 B1 | 3/2002 | Simpson |
| 6,371,334 B1 * | 4/2002 | Lombardi ..................... 222/325 |
| 6,493,970 B1 | 12/2002 | McCarthy et al. |
| 6,609,106 B1 | 8/2003 | Robertson |
| 6,639,849 B2 | 10/2003 | Takahashi et al. |
| 6,732,459 B1 | 5/2004 | Clark |
| 6,868,964 B2 | 3/2005 | Carty et al. |
| 6,877,263 B2 | 4/2005 | Clark |
| 6,923,316 B2 | 8/2005 | Carty et al. |
| 7,117,168 B2 * | 10/2006 | Eaton .............................. 705/26 |
| 2002/0023009 A1 * | 2/2002 | Ikeda ............................. 705/26 |
| 2002/0096441 A1 | 7/2002 | Simpson |
| 2002/0188525 A1 | 12/2002 | Terada |
| 2003/0004815 A1 | 1/2003 | Sakai et al. |
| 2003/0004997 A1 | 1/2003 | Parker et al. |
| 2004/0133505 A1 | 7/2004 | Deneef |
| 2004/0182940 A1 | 9/2004 | Biller |
| 2004/0238394 A1 | 12/2004 | Fuemmeler |
| 2005/0154652 A1 * | 7/2005 | Bezos et al. .................... 705/27 |

FOREIGN PATENT DOCUMENTS

WO WO 2005/054078 A1 6/2005

* cited by examiner

*Primary Examiner* — Olabode Akintola
(74) *Attorney, Agent, or Firm* — Sughrue Mion, PLLC

(57) ABSTRACT

A gift system for selecting and purchasing products or services at a fixed price, including: a box containing a plurality of samples for presentation of a product or service of a single type, each product or service for which a sample is contained having an identical fixed price paid by the acquirer of the system; and a voucher for ordering a product or service chosen from among those for which a sample is contained in the box.

5 Claims, No Drawings

SYSTEM FOR SELECTING AND PURCHASING PRODUCTS AT A FIXED PRICE

The present invention relates to a system for selecting and purchasing products at a fixed price.

It often happens that a person purchases a product for another and offers them this product in the form of a gift. Unfortunately, even if the product in question is of the type desired by the beneficiary of the said gift, it also often happens that the person wished to receive another product of the same type; either the one received is not suitable for them, or they already possess an identical product.

The principle of the gift certificate or gift voucher is known and allows a person to acquire such a certificate or gift voucher in exchange for the payment of a certain price and to offer this certificate or gift voucher as a gift to another person who can then use it with a product distributor who accepts this method of payment for their goods. This system avoids the above-mentioned drawback connected with a gift consisting of a product which was not suitable for its beneficiary but amounts in the end to offering a sum of money and not a product proper, which displays on the part of the giver an attention to the likings of the beneficiary and therefore has more emotive value for the latter than a certificate or gift voucher. Moreover, the beneficiary of a gift certificate or gift voucher must travel to a sales outlet in order to make a choice from amongst the products offered for sale in this outlet and use their certificate or gift voucher on the spot to acquire one of these products. Finally, it is customary in the west to not reveal the price of a gift to its beneficiary, which a certificate or gift voucher does not of course allow to be done.

The present invention solves the above-mentioned problems by proposing a system for selecting and purchasing products or services at a fixed price, which comprises a first means organised for containing a plurality of second means for presentation of a product or service of one and the same type, each product or service for which a second presentation means is contained by the said first means having an identical fixed price paid by the acquirer of the system, the system also comprising a third means for ordering a product or service chosen from amongst those for which a second presentation means is contained by the first means.

The system according to the invention therefore allows a first person who acquires it for a fixed price to give another person, to whom the first person offers the system as a gift, the possibility of making a choice from amongst a number of products or services of one and the same type and of ordering one of them, which can be delivered to them at home. Consequently, the invention solves the problem of an unfortunate choice by the giver of a product or service offered as a gift to another person since the latter can choose the product or service they prefer from amongst a large number, in practice generally of the order of ten or so, of products or services of the same type. The emotive power of the gift remains also, unlike the case of the gift certificate or gift voucher, since the choice of the product type offered is up to the giver. Moreover, the person receiving the system according to the invention as a gift does not know the price paid by the giver. They can also make a choice from amongst a number of products or services of one and the same type and receive one of them without travelling to an outlet selling these products or services.

The expression "presentation means" must be understood within the context of the present invention in the broad sense, namely any element representative of a product, whatever it is and whatever the medium of this representative element. It can be a physical sample of the product, a description or illustration of the product, a means of demonstrating the functions of the product, extracts of elements for which the product is the medium and any other means generally whatsoever allowing a person to imagine a product and consequently make a choice from amongst a number of products of one and the same type.

Thus, the products for which the system comprises a presentation means can be of very varied types, as can the presentation means itself. By way of non-limiting examples, there can be cited cosmetic or perfumery items where small amounts, such as a few millilitres of perfume or grams of care product, are presented in small receptacles, books and comic strips where extracts are presented, subscriptions to various magazines where the flyleaves and extracts of articles are reproduced, games where the principle of one part and illustrations of their appearance are presented, music CDs where extracts of certain tracks are contained on a presentation CD, video DVDs where scenes of a film they contain are assembled on a presentation DVD, games consoles where the functions and performance are described, perhaps even a demonstration of each presented on DVD, wines where the characteristics are described, perhaps even a small amount contained in a receptacle. The same principle of presentation of products of one and the same type is also applicable to toys, do-it-yourself products, plane tickets, domestic electrical appliances, clothes, telecommunication products, games of chance, etc.

The system according to the invention can also be applied to the presentation and purchase of services of all types, instead of products.

The first means according to the invention can consist of any receptacle whatsoever, for example a box on which there is indicated the type of product or service whose presentation means are contained in the system.

The system according to the invention also has the advantage of allowing the offering for sale of a plurality of products or services of one and the same type without these products or services having to be physically present in a sales outlet, which can represent a saving of space which can furthermore result in a price of each of the products or services presented in the system which is more advantageous than that generally applied in conventional retail business.

The invention claimed is:

1. A gift product to be acquired by an acquirer at a fixed price for giving to a recipient, said recipient being able to select and purchase goods at said fixed price paid by said acquirer, said gift product comprising:
   a receptacle that contains a plurality of physical samples of goods for presenting goods of a single type chosen by said acquirer,
   each of the goods having an identical fixed price to that paid by said acquirer of the gift product; and
   an ordering means for ordering a good chosen by said recipient from those that correspond to said plurality of physical samples of goods contained in said receptacle.

2. The gift product according to claim 1, wherein said receptacle comprises a box.

3. The gift product according to claim 1, wherein said ordering means comprises an order form to be filled in by the recipient with information relating to the chosen goods, and to an issuer or recipient of the order for said chosen goods.

4. The gift product according to claim 1, wherein said goods comprise one of: cosmetic items, perfumery items, or wines, and said physical sample comprises a small amount of a said goods placed in a small receptacle.

5. The gift product according to claim 1, wherein said acquirer of the gift product is a first person and said recipient of said gift product is another person.

\* \* \* \* \*